United States Patent [19]

Frost

[11] Patent Number: 5,718,300

[45] Date of Patent: Feb. 17, 1998

[54] ELECTRIC VEHICLE FINAL DRIVE

[75] Inventor: Barry L. Frost, Waterford, Mich.

[73] Assignee: New Venture Gear, Inc., Troy, Mich.

[21] Appl. No.: 441,211

[22] Filed: May 15, 1995

[51] Int. Cl.[6] ....................... B60K 1/00
[52] U.S. Cl. .............. 180/65.1; 180/65.6; 180/597; 475/331
[58] Field of Search ................ 180/65.1, 65.6, 180/65.7, 297; 74/412 R; 475/317, 331, 337, 339

[56] References Cited

U.S. PATENT DOCUMENTS

| | | | |
|---|---|---|---|
| 1,076,652 | 10/1913 | Hoffmann | 180/65.1 |
| 1,179,407 | 4/1916 | Decker . | |
| 1,442,220 | 1/1923 | Kelly . | |
| 1,794,613 | 3/1931 | Heany . | |
| 2,330,397 | 9/1943 | Trofimov . | |
| 2,519,118 | 8/1950 | Curtis et al. . | |
| 2,546,869 | 3/1951 | Przybylski . | |
| 3,861,485 | 1/1975 | Busch . | |
| 4,074,591 | 2/1978 | Dick | 475/317 |
| 4,517,858 | 5/1985 | Schafer | 475/331 |
| 5,226,339 | 7/1993 | Donato et al. . | |
| 5,285,111 | 2/1994 | Sherman | 180/65.2 |
| 5,289,890 | 3/1994 | Toyoda et al. . | |
| 5,326,334 | 7/1994 | Ra et al. | 475/317 |
| 5,419,406 | 5/1995 | Kawamoto et al. | 180/65.6 |
| 5,443,130 | 8/1995 | Tanaka et al. | 180/65.6 |
| 5,558,175 | 9/1996 | Sherman | 180/65.6 |
| 5,558,593 | 9/1996 | Roder et al. | 475/331 |

FOREIGN PATENT DOCUMENTS

| | | | |
|---|---|---|---|
| 0031052 | 2/1990 | Japan | 475/317 |
| 0221742 | 9/1990 | Japan | 475/331 |
| 406092152 | 4/1994 | Japan | 475/331 |

*Primary Examiner*—Anne Marie Boehler
*Assistant Examiner*—Min Yu
*Attorney, Agent, or Firm*—Harness, Dickey & Pierce, P.L.C.

[57] ABSTRACT

A drive unit for use with an electric vehicle comprising a planetary gear arrangement. The planetary arrangement includes a reduction portion and a differential portion and provides a large reduction of rotational speed between the motor and the differential portion while delivering differentiated power to the drive wheels. The planetary arrangement includes, in its preferred embodiment, a first ring gear grounded to the transmission housing, a first pinion carrier having a first set of pinions, a first sun gear formed on an input shaft, a second carrier mated with a first output shaft, the second carrier having a second set of pinions, a compound ring-sun gear operatively situated between the first and second sets of pinions, and a second sun gear formed on a second output shaft, the second sun gear being operatively mated with the second set of pinions. In the preferred embodiment the first set of pinions comprises two types of pinions of different diameters and different lengths alternating arranged on the first carrier ring. The first type of pinion is relatively wide and short and the second type of pinion is relatively narrow and long. An alternate embodiment of the planetary arrangement of the present invention is provided.

20 Claims, 3 Drawing Sheets

ELECTRIC VEHICLE FINAL DRIVE

BACKGROUND OF THE INVENTION

The present invention relates generally to drive systems for electric vehicles. More particularly, the present invention relates to a final drive system for an electric vehicle including a planetary gear arrangement.

While electric-powered vehicles appeared from time-to-time, they have not reached their expected production potential. For example U.S. Pat. No. 1,179,407 issued in 1916 to Decker, discloses an electric truck including a transmission having an aligned armature shaft, a pocket shaft and a main shaft, and a countershaft parallel thereto. Two pinion gears are slidably mounted on the mainshaft, while a third gear is secured thereon, and four pinion gears are secured to the shaft. By sliding the two slidably-mounted gears along the mainshaft to selectively engage the third gear of the mainshaft and three of the four gears of the countershaft, low, second, high and reverse speeds are attained.

U.S. Pat. No. 1,442,220, issued in 1923 to Kelly discloses an electric-powered automotive vehicle, preferably a truck, that includes a transmission having parallel motor and rear wheel drive shafts. A pair of gears are keyed to the motor shaft and a second pair of gears are rotatably mounted on the drive shaft and meshed with the first pair of gears. Clutch means are slidably keyed to the drive shaft intermediate the second pair of gears for establishing two drive speeds by selectively manually engaging one or the other of the second pair of gears.

U.S. Pat. No. 1,794,613 issued in 1931 to Heany, discloses a transmission system for automobiles and includes a combination of electromagnetic and mechanical clutches so arranged in connection with suitable gears as to give automatic change of speeds and also containing means of manually shifting into various forward and reverse speeds. The transmission includes a main drive shaft, a parallel countershaft and a short shaft supporting an idler gear. Three gears are mounted on a sleeve slidably keyed to the mainshaft. Three gears are secured to the countershaft, one of which meshes with the idler gear. Selectively sliding the three sleeve-mounted gears in cooperation with two of the three gears of the countershaft and the idler gear produces low, second, and reverse speed ratios.

In U.S. Pat. No. 5,226,339, issued in 1993 to Donato et al. and assigned to the assignee of the present invention, a manual two-speed automotive transmission adapted to being driven by an electric motor is disclosed. The transmission includes an input shaft assembly driven by the motor via its armature, a flywheel and a clutch, an input gear assembly axially aligned with and separated from the input shaft assembly, and a transfer shaft assembly parallel to the input assemblies. A two-gear speed reducer rotatably mounted on the transfer shaft assembly connects a fixed gear of the input shaft assembly to a fixed gear of the input gear assembly. Additional gears are rotatably mounted on the transfer shaft assembly and are secured to the input gear assembly such that a synchronizer assembly on the transfer shaft cooperates with the various gears to drive the transfer shaft and a final output gear mounted thereon at a low or high speed.

While each of these inventions have helped to overcome the difficulties in this art to some degree, there is still room for improvement. Perhaps the greatest difficulty faced by designers of electric vehicles relates to the efficient transmission of power from the electric motor to the drive wheels. This is due to the fact that because complication and expense of electric motor used in electric vehicles is mostly a function of the required torque (instead of its output), it is necessary that the speed of the electric motor's output be significantly reduced before reaching the drive wheels.

In response to this need, attempts have been made at providing efficient gearing in electric vehicles. For example, U.S. Pat. No. 3,861,485, issued in 1975 to Busch, discloses an electric motor vehicle including a planetary transmission having an input shaft from a shunt-wound electric motor, a parallel final output shaft of an electric clutch, a parallel output shaft to the drive wheels, an input gear on the input shaft, and a meshing gear on the final output shaft. Ring, planet and sun gears are provided on the latter connected by a uni-directional clutch to a separately-mounted gear which meshes with a gear carried on the electric clutch shaft. Variable-pitch pulleys on the input and the electric clutch shafts are interconnected by a V-belt. At low speeds the electric motor is connected via the variable-pitch pulleys and V-belt to the wheels, and for higher speeds the motor is connected thereto via the above-referenced gearing. Reverse is effected by reversing the motor electrically. While providing an improvement over earlier attempts at perfecting electric vehicle drive systems, the Busch arrangement is cumbersome and overly complex, necessarily leading to high production and maintenance costs.

Accordingly, and because of the need to improve the efficiency of drive systems of electric vehicles and to reduce the weight and size of such systems, there is still wanting a practical drive system for an electric vehicle. Such a system must operate within, in a relatively simple manner, the parameters of current storage battery and electric motor technologies. The gear train that uses motor output efficiently can operate satisfactorily with a smaller motor than less efficient gear trains. Furthermore, a more efficient gear train would allow the same vehicle to travel farther on a single charge. Similarly, reduced weight will also allow the vehicle to travel farther on a single charge. Finally, a compact gear train will not only offer the above-noted advantage of reduced weight, but also provide the vehicle with more battery, cargo and passenger space.

The present invention relates to a system for electric vehicles which includes a planetary gear arrangement having a reduction portion and a differential portion. The present invention provides a final drive for an electric vehicle having operating characteristics different from and advantageous over the prior art.

SUMMARY OF THE INVENTION

Accordingly, it is an object of the present invention to provide an improved drive unit for an electric vehicle that incorporates a planetary arrangement.

It is another object of the present invention to provide an improved drive unit for an electric vehicle which is designed to efficiently and practically transmit motor rotation and power to the drive wheels of the vehicle at various speeds.

It is yet another object of the present invention to provide an improved drive unit for use with an electric vehicle having a transmission in which the arrangement of planetary gears and the placement of the differential allows compactness of construction and light weight.

It is still another object of the present invention to provide an improved drive unit for use in an electric vehicle that includes few parts and provides for a large reduction of rotation between the electric motor and the driven wheels.

Accordingly, the present invention is directed to a drive unit for use with an electric vehicle comprising a planetary arrangement. The planetary arrangement includes a reduction portion and a differential portion and provides a large reduction of rotational speed between the motor and the differential portion while delivering differentiated power to the drive wheels. The planetary arrangement includes, in its preferred embodiment, a first ring gear grounded to the transmission housing, a first pinion carrier having a first set of pinions, a first sun gear formed on an input shaft, a second carrier mated with a first output shaft, the second carrier having a second set of pinions, a compound ring-sun gear operatively situated between the first and second sets of pinions, and a second sun gear formed on a second output shaft, the second sun gear being operatively mated with the second set of pinions. In the preferred embodiment the first set of pinions comprises two types of pinions of different diameters and different lengths alternating arranged on the first carrier ring. The first type of pinion is relatively wide and short and the second type of pinion is relatively narrow and long.

An alternate embodiment of the planetary arrangement of the present invention includes a first ring gear grounded to the transmission housing, a compound first pinion carrier and second ring gear on which a first set of pinions are carried, a second carrier mated with a first output shaft, the second carrier having a second set of pinions, a first sun gear formed on an input shaft, the first sun gear being operatively mated with the first set of pinions, and a second sun gear formed on a second output shaft, the second sun gear being operatively mated with the second set of pinions.

The geartrain is preferably housed in a magnesium housing and is preferably coupled to a three phase variable speed electric motor. The electric motor drive shaft is concentric with the drive shaft to the wheels, this being made possible by using a hollow motor output shaft, whereby one drive shaft is connected to a first drive wheel through the motor output shaft and the other drive shaft is connected to the other drive wheel on the opposite side of the drive motor. A parking element is present to interlock with a transmission gear to lock the vehicle when not in operation. The final drive of the present invention finds application in either front-wheel drive (FWD) or rear-wheel drive (RWD) vehicles.

BRIEF DESCRIPTION OF THE DRAWINGS

The above-noted and other advantages of the present invention will become apparent to one skilled in the art by reading the following specification and subjoined claims in conjunction with reference to the following drawings in which:

DETAILED DESCRIPTION OF THE PREFERRED EMBODIMENTS

The drawing discloses the preferred embodiments of the present invention. While the configurations according to the illustrated embodiments are preferred, it is envisioned that alternate configurations of the present invention may be adopted without deviating from the invention as portrayed. The preferred embodiments are discussed hereafter.

In general, the present invention is directed to a final drive for use with an electric vehicle. As will be understood, the novel final drive to be disclosed herein is shown in a merely exemplary application to which modifications can be made. As will be set forth, the figures schematically illustrate two embodiments of the final drive arrangement for use with an electric vehicle. However, the planetary arrangements represented in these preferred embodiments may be modified to represent other planetary arrangements.

Figures 1, 3:
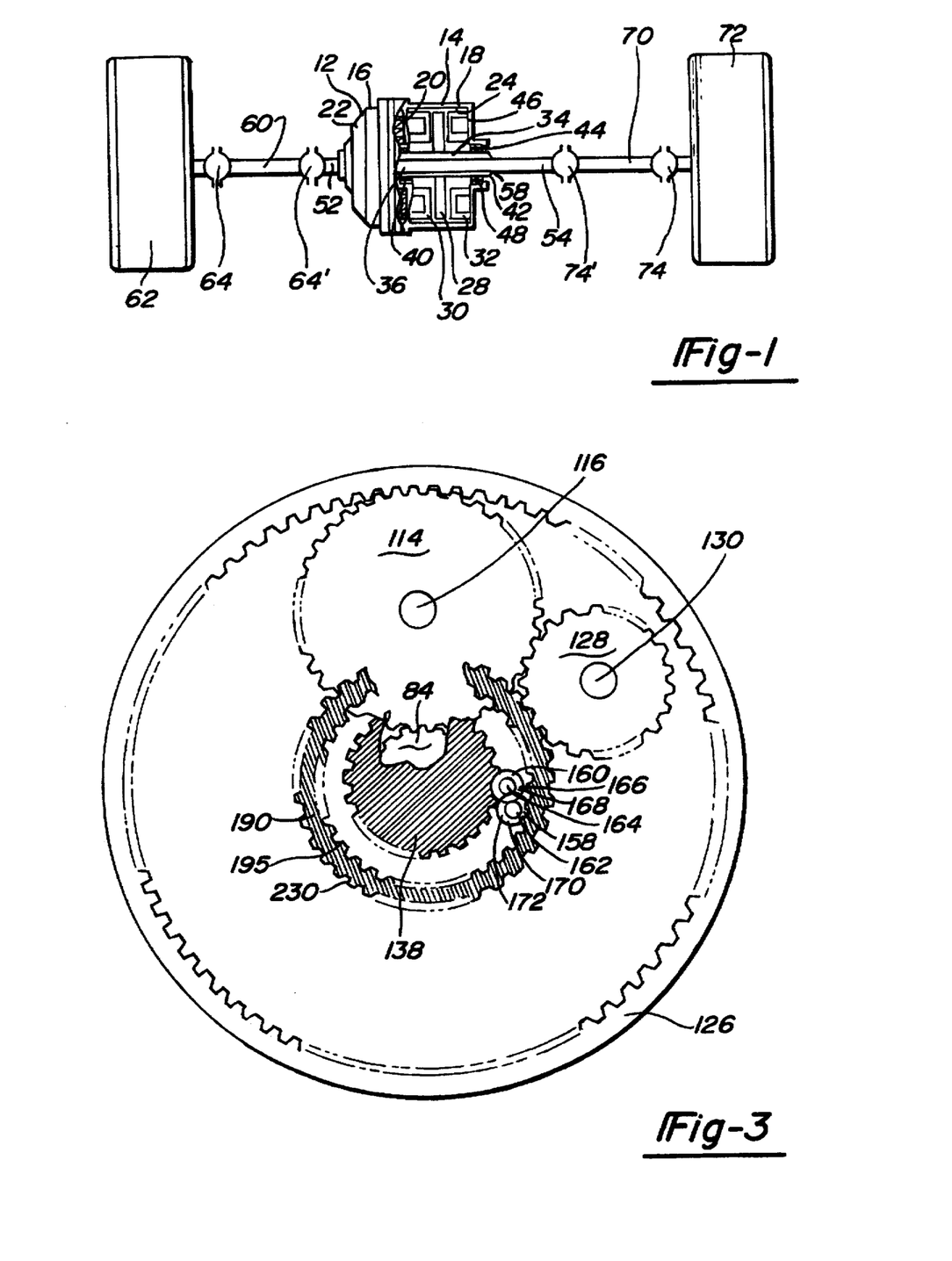
FIG. 1 is a partial environmental view illustrating placement of the drive unit of the present invention in relation to axle shafts and drive wheels and illustrating a motor partially sectioned.
FIG. 3 is a plan view in partial section of an array of planetary gears incorporated with the preferred embodiment of the transmission.

With reference to FIG. 1, a drive unit for an electric vehicle is generally illustrated as 10. The drive unit 10 comprises a transmission 12 and an electric motor 14. The transmission 12 and the electric motor 14 are mated as will be detailed further below.

The transmission 12 includes a transmission housing 16. The housing is preferably composed of magnesium to conserve weight. The electric motor 14 includes a motor housing 18. An intermediate wall 20 is disposed between the transmission housing 16 and the motor housing 18. The wall generally defines a transmission housing portion 22 and a motor housing portion 24. The transmission housing 16, the wall 20, and the motor housing 18 are mated together by a coupling fastener such as a bolt 26.

The electric motor 14 is housed within the motor housing portion 24. The motor 14 is preferably of the three phase variable speed alternating current type, as illustrated, although it is conceivable that a direct current motor could be used in the alternative. The motor 14 comprises a rotor 28 and a pair of stators 30 and 32. The stators 30 and 32 are situated at opposite sides of the rotor 28. The stators 30 and 32 are integrally mated with the motor housing 18. The rotor 28 rotates together with a rotor quill shaft 34 which is rigidly connected to the rotor 28. A first end 36 of the quill shaft 34 extends through an aperture 38 formed through the wall 20 and is rotatably supported therein by a suitable bearing assembly 40. An opposite second end 42 of the quill shaft 34 extends through an aperture 44 formed in an end wall 46 of the motor housing 18 and is likewise supported for rotation therein by a suitable bearing assembly 48.

The transmission 12 includes a planetary gear assembly (generally illustrated as 50 in FIG. 2), a first drive output shaft 52, and a second drive output shaft 54. The second drive output shaft 54 extends through the quill shaft 34 and is rotatably supported for rotation therein by suitable bearings, such as a first set of needle bearings 56 (shown in FIG. 2) and a second set of needle bearings 58.

A first half drive shaft 60 connects a first drive wheel 62 to the first drive output shaft 52. Situated between the first drive wheel 62 and the first shaft 52 and separating the first half drive shaft 60 into three segments are a pair of first output shaft universal joints 64 and 64'.

A second half drive shaft 70 connects a second drive wheel 72 to the second drive output shaft 54. Situated between the second drive wheel 72 and the shaft 54 and separating the second half drive shaft 70 into three segments are a pair of second universal joints 74 and 74'.

Figure 2:
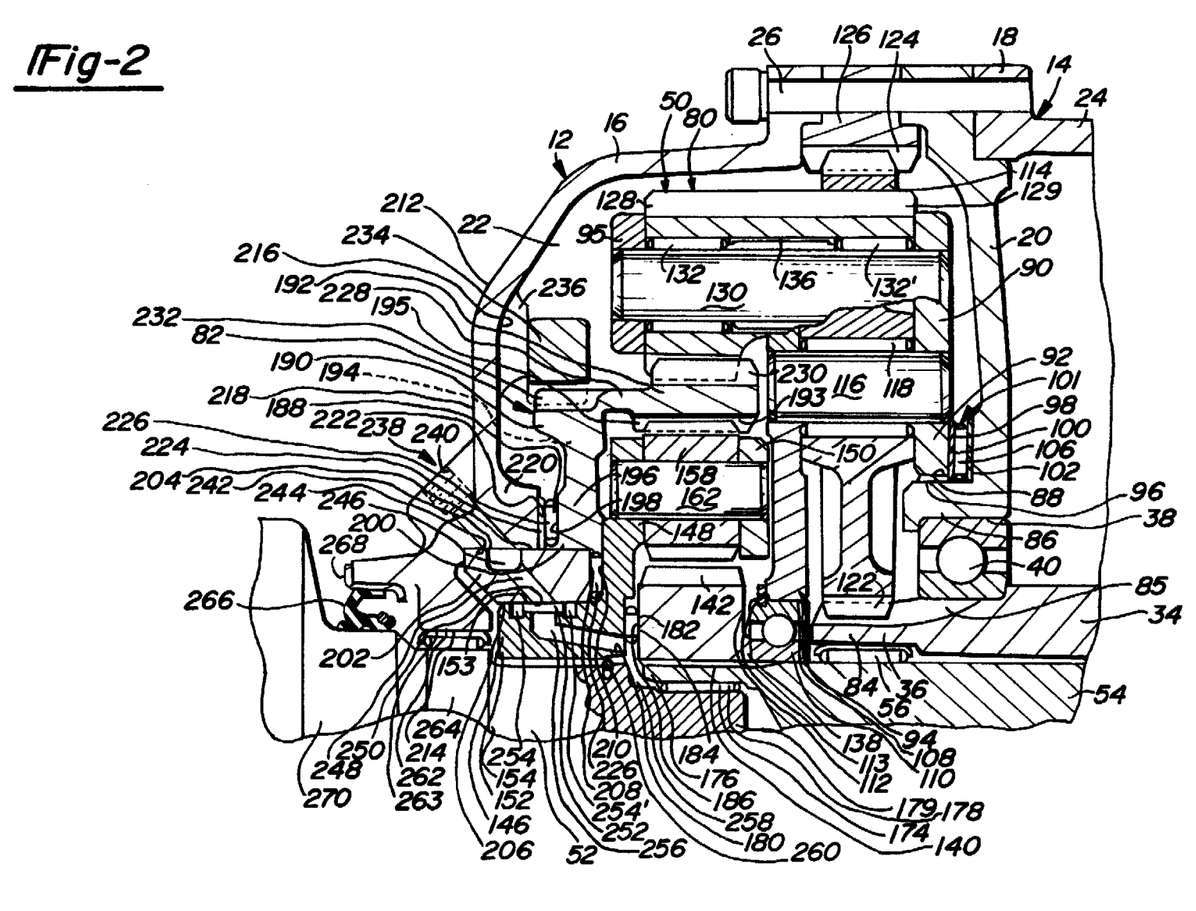
FIG. 2 is a sectional view of the preferred embodiment of the transmission of the drive unit of the present invention for use with an electric vehicle having a planetary arrangement of the present invention.

With particular reference to FIGS. 2 and 3, sectional views of the planetary gear assembly 50 of the drive unit 10 constructed according to the preferred embodiment are provided. In general, the drive unit 10 finds application in either front-wheel drive or rear-wheel drive vehicles.

The transmission 12 is operatively arranged to transfer motor torque from the motor 14 through the planetary gear assembly 50, to the first and second drive shafts 52 and 54, and to the drive wheels 24 and 34 through the drive shafts 22 and 34 through the drive shafts 22 and 32 respectively. The planetary gear assembly 50 very generally comprises a first planetary or reduction portion 80 and a second planetary or differential portion 82.

In general, the portion 80 is operatively mated with the quill shaft 34 of the motor 14. More particularly, the first end 36 of the quill shaft 34 includes a sun gear 84 comprising fluted teeth 85 axially formed on the shaft 34. The first end 36 of the shaft 34 is rotatably supported in the wall 20 by the bearing assembly 40 supported in a flange 86 having an external shoulder 88. The bearing assembly 40 is preferably of the ball type, although other bearings could well be used.

A first planetary carrier 90 is provided and comprises an inboard carrier ring 92, an intermediate carrier ring 94, and an outboard carrier ring 95. The rings are suitably connected and maintained in spaced apart relation as by machine bolts (not shown). The inboard ring 92 includes a centrally formed aperture 96 for rotation about the flange 86. A bearing sleeve 97 is provided on the flange 86 and supports the ring 92 for rotation. The ring 92 is also axially supported for rotation by a bearing assembly generally indicated as 101. The assembly 101 comprises a radial bearing surface 98 fixed to an inboard side 100 of the ring 92. A radial bearing surface 102 is also provided and is fixed to an outer side 104 of the wall 20 adjacent the flange 86. A plurality of needle bearings 106 are disposed between the two bearing surfaces 98 and 102.

The intermediate carrier ring 94 includes a centrally formed aperture 108 in which a suitable bearing assembly 110, preferably of the roller type, is provided for rotational support by the second drive output shaft 54. A ring 112 positioned within a groove 113 limits leftward axial movement of the carrier 90.

A plurality of wide and short planet pinions 114 are provided. Each planet pinion 114 is rotatably journalled on a pin 116 that is supported between the inboard carrier ring 92 and the intermediate carrier ring 94. The pinions 114 are rotatably supported on the pins 116 by needle bearings 118. The teeth 85 defining the sun gear 84 are in constant mesh with teeth 122 of the planet pinions 114. In addition, teeth 122 of the planet pinions are also meshed with teeth 124 of a first planetary annular ring gear 126 fixedly disposed between the periphery of the wall 20 and the inboard end of the transmission housing 16. The annular ring gear 126 is also supported by the machine bolts 116.

In addition to the plurality of wide and short first planet pinions 114, the first planetary carrier 90 also includes a plurality of narrow and long planetary pinions 128 with each planet pinion 128 being provided adjacent each pinion 114 in an alternating manner. The side-by-side relationship of the pinions 114 and 128 is clearly seen in FIG. 3. The pinions 128 have a plurality of axially-defined teeth 129. Each of the pinions 128 is rotatably journalled on a pin 130 that is supported between the outboard carrier ring 95 and the inboard carrier ring 92, suitably connected as by machine bolts (not shown). The pinions 128 are rotatably supported on the pins 130 by a pair of sets of needle bearings 132 and 132'. A spacer ring 136 maintains the sets of needle bearings 132 and 132' in spaced apart relation.

The second planetary or differential portion 82 generally includes a sun gear 138 that is splined to a first end 140 of the second drive output shaft 54. The sun gear 138 includes axially formed external teeth 142. A second planetary carrier 146 comprises an outboard ring 148 and a spaced apart inboard ring 150. The rings 148 and 150 are suitably interconnected as by machine bolts (not shown). The outboard ring 148 of the second planet carrier 146 includes an integrally mated tubular sleeve 152. The sleeve 152 is splined to an input end 154 of the first drive output shaft 52 and includes an outer curved wall 153. Supported between the outboard ring 148 and the inboard ring 150 are a plurality of input pinions 158 and a plurality of output pinions 160, with the latter pinions being shown only in FIG. 3. The input pinions 158 are rotatably journalled on a pin 162 that is supported between the outboard carrier ring 148 and the inboard carrier ring 150. The output pinions 160 are rotatably journalled on a pin 164 that is also supported between the outboard carrier ring 148 and the inboard carrier ring 150.

The pinions 160 each includes an outer periphery 166 that has a plurality of axially-aligned teeth 168 formed thereon. The teeth 168 meshingly engage the teeth 142 of the sun gear 138. The teeth 168 also are meshed with teeth 170 defined on the outer periphery 172 of the pinions 158 (shown exclusively in FIG. 3). As illustrated in FIG. 3, a counterbore 174 is defined in the input end 176 of the second drive output shaft 54. A portion of the input end 176 is rotatably supported within the counterbore 174 by a set of needle bearings 178 arrayed upon a bearing surface 179 formed on the rightward end of the first drive output shaft 52.

Formed on the inboard end 180 of the sleeve 152 is a radial surface 182. A plurality of needle bearings 184 are positioned between the surfaces 182 and 186. Formed on the outboard end of the sun gear 138 is a radial surface 186.

Operatively interconnecting the reduction portion 80 and the differential portion 82 is a compound ring-sun gear 190. The gear 190 includes an elongated drum portion 192 integrally mated with a radial portion 194. The drum portion 192 defines an inner annular wall 193 that has formed thereon a plurality of axial teeth 195. The radial portion 194 includes an outer radial flange 196 having a bearing surface 198. The radial portion 194 further includes a centrally defined aperture 200 having an inner wall that is journalled to a tubular sleeve 202. The sleeve 202 includes an outer curved wall 204, an inner curved wall 206, and an inboard radial wall 208. Disposed between an outer radial wall 210 of the outboard ring 148 and the inner radial wall 208 of the sleeve 202 are a plurality of needle bearings 226, thereby allowing the carrier 146 to rotate independently relative the rotational movement of the compound gear 190.

The transmission housing 16 includes a generally radial end wall 212 having a centrally formed drive shaft aperture 214. The wall 212 has an inner side 216 and an outer side 218. A radial flange 220 is formed on the inner side 216 of the wall 212 and has a radial surface 222. A bearing surface 224 composed of an appropriate durable material is fixed to the radial surface 222. Between the bearing surface 224 and the bearing surface 198 are provided a plurality of needle bearings 226, thereby allowing the compound gear 190 to rotate independently relative to the end wall 212 while still relying on the latter structure for rotational support.

The drum portion 192 of the compound gear 190 includes an outer curved wall 228. Defined on the outer curved wall 228 are a pair of adjacent sets of peripherally-formed gear teeth comprising driven teeth 230 and braking teeth 232. The driven teeth 230 are constantly meshed with the teeth 129 of the pinion 128.

A park lock pawl 234 is adapted for slidable movement on a flange 236 formed on the inner side 216 of the wall 212. Movement of the lock pawl 234 is controlled by the operator either electrically or mechanically for positioning between an unlocked position in which the compound gear 190 is allowed to freely rotate to a locked position (as illustrated) in which the pawl 234 is fitted between two adjacent teeth of the braking teeth 232. Thus positioned, rotational movement of the transmission is prevented by the locking pawl 234.

The rotational elements of the planetary gear assembly 50 require thorough lubrication while in operation, as is understood by those skilled in the art. A pressure lubrication system, generally illustrated as 238, provides a method for providing the necessary lubricant directly to the rotational elements of the assembly 50. The lubrication system 238 includes a series of both linear passageways and peripheral grooves that provide a continuous passage between the exterior of the transmission housing 16 and the rotational elements of the assembly 50.

A housing passageway 240 is defined in the end wall 212 of the housing 16. The passageway 240 includes a zirc fitting (not shown) or an alternative suitable one-way fitting at its external end. The housing passageway 240 is continuous between the exterior of the housing 16 (selectively blocked by the fitting) and the interior of the housing 16. The passageway terminates internally at an opening 242 formed in the wall of a counterbore 244 defined adjacent the aperture 214. A peripheral lubricant groove 246 is defined continuously around the outer curved wall 204 of the tubular sleeve 202. This design allows for lubricant to pass through the housing passageway 240 and into the groove 246 regardless of the rotated position of the sleeve 202.

At least one carrier passageway 248 is defined transversely through the sleeve 202 and is continuous between the groove 246 and an inner opening 250. The opening 250 is continuous with a peripheral lubricating groove 252 defined in the outer curved wall 153 of the sleeve 152. Similar in configuration to the groove 246, the groove 252 is continuously defined around the sleeve 152. A pair of seals 254 and 254' are provided on opposite sides of the groove 252.

At least one lubricating passageway 256 is defined between the groove 252 and the radial surface 182 of the sleeve 152. The passageway 256 is continuous between the groove 252 and the surface 182. This construction allows for the pressurized insertion of a lubricant to a continuous annular lubricant plenum 258, the presence of which provides a method by which lubricant may bathe the bearings and many other moving parts of the assembly 50. An O-ring seal 260 prevents leakage of lubricant out of the plenum 258 toward the aperture 214. As with the sleeve 202, the provision of the channel 252 provides a method of delivering lubricant between the passageway 248 and the passageway 256 regardless of the relative rotated position of the sleeve 152.

A suitable bearing, such as a plurality of needle bearings 262, are provided between a bearing 263 fixed within the aperture 214 and a bearing surface 264 formed on the shaft 52. In addition, to prevent the escape of drive shaft lubricant from the housing 16, an annular seal 266 composed of rubber or a similar resilient, oil-resistant material is provided in the gap present between a counterbore 268 defined in the end wall 212 that is coaxial with the aperture 214 and a smooth surface 270 formed on the shaft 52.

Power transmission is set forth as follows. The quill shaft 34 is caused to rotate by a magnetic field acting upon the integrally-mated rotor 28 by the stators 30 and 32. Rotation of the quill shaft 34 causes rotary of motion of the gears 114, which are meshed with both the teeth 85 of the sun gear 84 and the teeth 124 of the ring gear 126. Because the ring gear 126 is grounded to the housing 16, the carrier 90, which carries the gears 114, is forced to rotate.

Also rotatably supported by the carrier 90 are the plurality of gears 128. The teeth of the gears 128 mesh continuously with both the teeth of the gears 114 (as seen in FIG. 3) and with the outer teeth 230 of the gear 190. Assuming that the pawl 234 is in its unlocked position, the gear 190 freely rotates on the sleeve 202. The inner teeth 195 of the gear 190, defining a ring gear, are meshed with the pinions 158 supported on the carrier 146. Rotational power delivered to the pinions 158 provides differentiated power to the drive wheels through the carrier 146 and the first drive output shaft 52 and, through driven rotation of sun gear 138 (by the pinions 160), to the second drive output shaft 54. The gear sizes of the assembly 50 preferably result in a speed reduction of 10:1.

Figure 4:
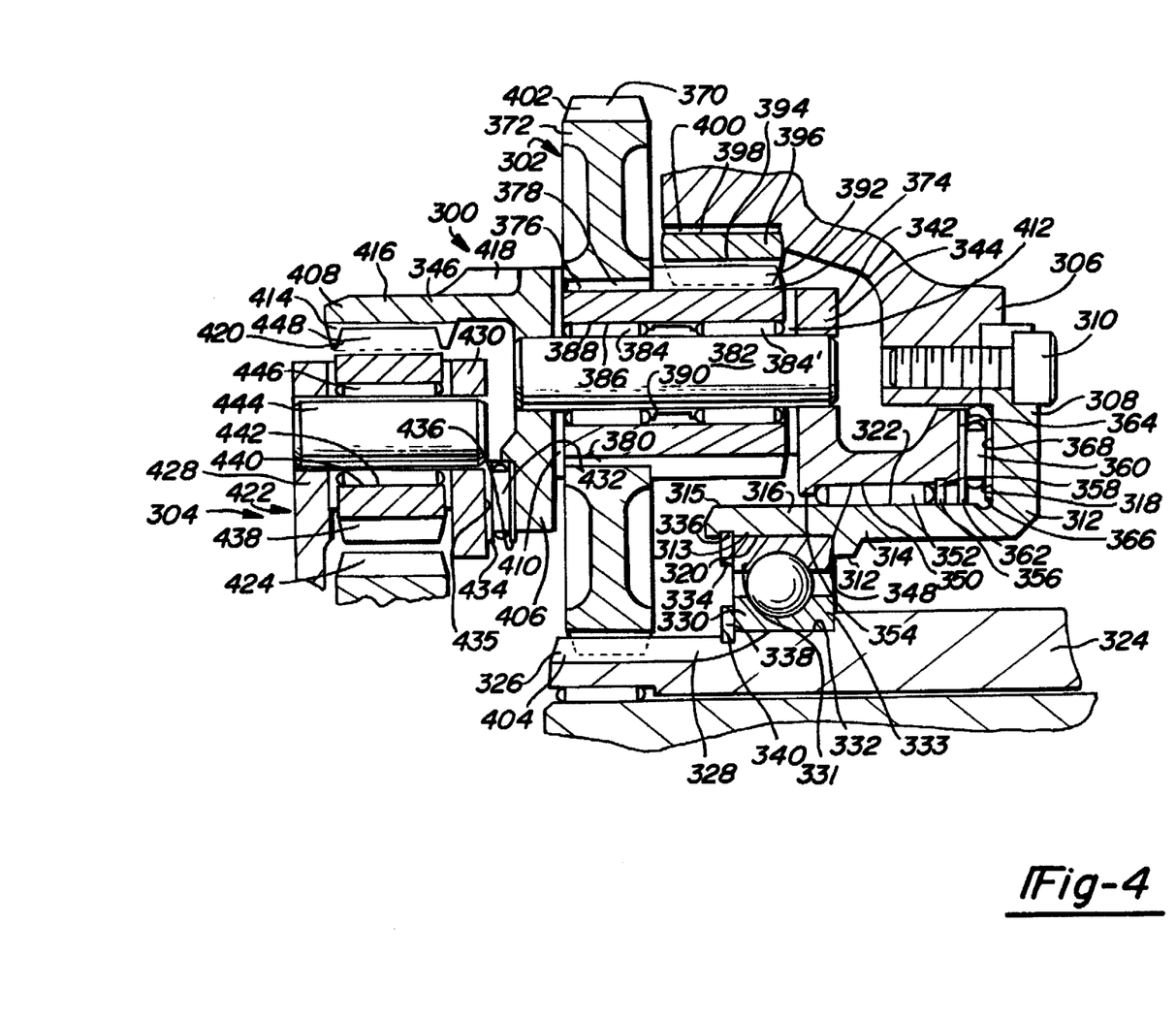
FIG. 4 is a sectional view of an alternate embodiment of the transmission of the drive unit for use in the present invention.

Referring to FIG. 4, a sectional view of an alternate embodiment of the transmission of the drive unit of the present invention is shown. Like the transmission described above, the present embodiment finds application in either front-wheel drive or rear-wheel drive vehicles.

The illustrated embodiment includes a planetary gear assembly 300 that comprises a first planetary portion or reduction 302 and a second planetary or differential portion 304. The gear assembly 300 is housed within a main housing 306. A wall 308, similar to the previously described wall 20, is mated to the main housing 306 by means of fasteners such as a bolt 310. The wall 308 includes a radially-extending portion 312 having an inner surface 318. The wall 308 also includes an axially-extending drum portion 314 having an inner surface 313 and an outer surface 315. Defined on the inner surface 313 is a counterbore 320. Formed on the surface 316 is a bearing surface 322.

In general, the first planetary portion 302 is operatively mated with a quill shaft 324, similar in design and function of the quill shaft 34 set forth above. The quill shaft 324 includes an output end 326 that includes a sun gear 328 comprising fluted teeth axially formed on the shaft 324. The output end 326 of the shaft 324 is rotatably supported in the drum portion 314 of a wall 308 by a suitable bearing such as ball bearing 330. The bearing 330 includes an outer race 331 that is nested within the counterbore 320. The bearing 330 also includes an inner race 333 that is supported on a surface 332 formed adjacent the sun gear 328. While rightward movement of the bearing 330 is jointly prohibited by shoulders formed on both surfaces 320 and 332, leftward movement is prohibited by both a ring 334 provided in a groove 336 defined in the surface 313 and a ring 338 provided in a groove 340 defined in the surface 332. While the bearing 330 is preferably of the ball type, other suitable bearings could as well be used.

A first planetary carrier 342 comprises an inboard carrier ring 344 and a compound ring gear-carrier ring 346. The rings 344 and 346 are suitably connected and maintained in spaced apart relation as by machine bolts (not shown). The inboard ring 344 includes a centrally formed aperture 348 for rotation about the drum portion 314. An annular bearing surface 350 is formed in the centrally formed aperture 348. A suitable bearing member, such as needle bearings 352, rotatably support the ring 344 on the bearing surface 322. Leftward movement of the bearings 352 is prohibited by an annular shoulder 354 formed on the carrier ring 344. Rightward movement of the bearings 352 is prevented by a ring 356 fitted within a groove 358 defined in the bearing surface 350.

The carrier 342 is maintained in spaced apart relation from the radially-extending portion 312 of the wall 308 by a plurality of needle bearings 360 supported between a radial bearing surface 362 fixed to a radial wall 364 of the carrier ring 344 and a radial bearing surface 366 fixed to an inner radial wall 368 of the portion 312.

One of the characteristics that distinguishes the present embodiment of the transmission of the present invention from that discussed above with respect to FIGS. 2 and 3 is the presence of a compound planet pinion 370 as opposed to the separate pinions 114 and 128 described above. The compound planet pinion 370 includes a wide and short gear 372 and a narrow and long gear 374. The gear 372 includes a centrally formed aperture 376 having a plurality of splines 378 formed thereon. The splines 378 are mated with a plurality of splines 380 formed exteriorly on the gear 374. Hence, the gears 372 and 374 rotate as a unit.

Each pinion 370 is rotatably journalled on a pin 382 that is supported between the inboard carrier ring 344 and the ring 346. Each pinion 370 is rotatably mounted on the pins 382 by sets of needle bearings 384 and 384' disposed between a pinion bearing surface 386 formed on a central throughbore 388 of the pinion 370 and the pin 382. A bearing spacer ring 390 is provided between the sets of needle bearings 384 and 384' to limit axial translation.

The gear 374 of the pinion 370 includes a plurality of exteriorly formed teeth 392. The teeth 392 are in constant meshed engagement with teeth 394 formed interiorly on a ring gear 396. The ring gear 396 is fixed to the housing 306 by splines 398 that fixedly engage splines 400 formed in the housing 306.

The gear 372 of the pinion 370 includes a plurality of gear teeth 402 formed on its outer periphery. The gear teeth 402 are in constant meshed engagement with teeth 404 formed at the end 326 of the shaft 324.

The compound ring gear-carrier ring 346 includes a radially-extending wall portion 406 and an axially-extending drum portion 408. The wall 406 is separated from the pinion 370 by a radial bearing 410. Similarly, a radial bearing 412 separates the pinion 370 from the carrier ring 344.

The drum portion 408 of the ring 346 includes an inner peripheral wall 414 and an outer peripheral wall 416. A plurality of brake pawl-engaging teeth 418 are formed on the outer peripheral wall 416. A pawl (not shown) operates in the same manner as the pawl 234 set forth above with respect to the embodiment of FIGS. 2 and 3 to stop rotational movement of the assembly 50. A plurality of gear teeth 420 are formed on the inner peripheral wall 414. The gear teeth 420 define a ring gear and, together with a carrier assembly 422 operatively associated with the first drive output shaft 52 (shown in FIG. 1) and a sun gear 424 (operatively associated with the second drive output shaft 54, also shown in FIG. 1), define the differential portion 304. Like the differential portion 82 described above with respect to FIGS. 2 and 3, the differential assembly 304 differentiates rotational output power delivered from the reduction portion between the drive wheels 24 and 34.

The carrier assembly 422 comprises an outboard ring 428 and a spaced apart inboard ring 430. The inboard ring 430 is partially supported by the wall 406 of the ring 346 as by a suitable bearing, such as needle bearings 432. The bearings 432 are positioned between a bearing 434 fixed to a radial wall 435 of the carrier ring 430 and a bearing 436 fixed to the radial wall 406. The rings 428 and 430 are suitably interconnected as by machine bolts (not shown). The outboard ring 428 of the carrier assembly 422 is mated with the first drive output shaft 52 substantially in the same manner as discussed above with respect to the embodiment disclosed in FIGS. 2 and 3. Supported between the outboard ring 428 and the inner ring 430 are a plurality of input pinions 438 and a plurality of output pinions (not shown). The pinions 438 include an axial throughbore 440 having a bearing surface 442 formed thereon. The pinions are rotatably supported on a pin 444 between the outer carrier ring 428 and the inner carrier ring 430 by a plurality of needle bearings 446.

Each pinion 438 includes a plurality of axial gear teeth 448 exteriorly formed thereon. The gear teeth 448 are in constant meshed engagement with the teeth 420 of the wall 414 of the carrier 416. The output pinions (not shown) operatively interconnect the pinions 438 and the sun gear 424 in the same manner as set forth above with respect to the embodiment of FIGS. 2 and 3. The sun gear 424 is operatively mated with the second output drive shaft 54 in a manner also similar to that in the embodiment described above with respect to FIGS. 2 and 3.

Power transmission according to the embodiment of FIG. 4 is as follows. The quill shaft 324 is caused to rotate as set forth above with respect to the above-described preferred embodiment. Rotation of the shaft 324 causes rotary movement of the compound gears 370, as the ring gear 396 is locked against rotation. Movement of the gears 370 effects rotational movement of the carrier ring 346. The gear teeth 420, acting as ring gear teeth, effect rotation and consequent movement of the pinions 438. Rotational power delivered to the pinions 438 provides differentiated power to the drive wheels through the carrier ring 428 and the first drive output shaft 52 and through driven rotation of the sun gear 424 (by the output pinions) to the second drive output shaft 54.

While being less complex than the embodiment shown and described above with respect to FIGS. 2 and 3, the embodiment of FIG. 4 is longer and hence requires more space. One or the other of these embodiments may be selected after weighing the respective advantages of the two embodiments.

Furthermore, while the adjectives "left" and "right" and "inboard" and "outboard" have been used in the description above in reference to the relative positions of some of the elements and the adverbs "leftward" and "rightward" have been used in reference to movements of some of the elements, it must be understood that these positions are specified for the array as set forth above. It is deemed possible that other arrays may be used without deviating from the invention as portrayed, thus minimizing the absolute significance of these words.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A drive unit for an electric vehicle, said electric vehicle having a first drive wheel and a second drive wheel, said drive unit comprising:

an electric motor including an output quill shaft; and a transmission including a first planetary assembly and a second planetary assembly, said first planetary assembly being operatively connected to said output quill shaft of said motor, said first planetary assembly and said second planetary assembly being operatively interconnected by a compound ring-sun gear, a first output drive shaft operatively connected with said first drive wheel, a second output drive shaft, rotatably mounted within said output quill shaft and operatively connected with said second drive wheel, and said second planetary assembly being operatively interconnected with said first and second output drive shafts.

2. The drive unit for an electric vehicle of claim 1 wherein said transmission further includes a transmission housing and wherein said first planetary assembly includes a first sun gear driven by said output shaft of said motor, a first ring gear fixed to said transmission housing, a first carrier, a first pinion gear rotatably supported on said first carrier and meshed with said first sun gear and said first ring gear, and a second pinion gear rotatably supported on said first carrier and meshed with said first pinion gear, wherein said second planetary assembly includes a second sun gear fixed to said second output drive shaft, rotatably mounted within said output quill shaft and a second carrier fixed to said first output drive shaft, a third pinion gear rotatably supported on said second carrier and meshed with said second sun gear, and a fourth pinion gear rotatably Supported on said second carrier and meshed with said third pinion gear, and wherein said compound ring-sun gear is supported for rotation relative to said transmission housing and includes a third sun gear meshed with said second pinion gear and a second ring gear meshed with said fourth pinion gear.

3. The drive unit for an electric vehicle of claim 2 wherein said first pinion carrier of said first planetary assembly comprises an inner carrier ring and an outer carrier ring, said inner and outer carrier rings being fixed to each other.

4. The drive unit for an electric vehicle of claim 3 wherein each of said pinions comprises a first gear having a first radius and a second gear having a second radius, said first radius being greater than said second radius, said pinions being rotatably mounted on a pin, said pin being fixed between said inner carrier ring and said outer carrier ring, said first and second gears being concentric with respect to said pin.

5. The drive unit for an electric vehicle of claim 4 wherein said second gear of said pinions is in constant meshed engagement with said ring gear fixed to said transmission housing.

6. A drive unit for an electric vehicle, said electric vehicle having a first drive wheel and a second drive wheel, said drive unit comprising:
an electric motor, said electric motor including an output shaft; and
a transmission, said transmission including a first planetary assembly and a second planetary assembly, said first planetary assembly being operatively connected to said output shaft of said motor, said first planetary assembly and said second planetary assembly being operatively interconnected and said second planetary assembly being operatively interconnected with said first and said second drive wheels;
wherein said transmission further includes a transmission housing and said first planetary assembly comprises a first sun gear formed on said output shaft of said motor, a first pinion carrier, a first ring gear fixed to said transmission housing, a first set of pinions rotatably mounted on said first pinion carrier and meshingly engaging said first sun gear and said first ring gear, and a second set of pinions rotatably mounted on said first pinion carrier and meshingly engaging said first set of pinions.

7. The drive unit for an electric vehicle of claim 6 wherein said first set of pinions has a radius and said second set of pinions has a radius, said radius of said first set of pinions being larger than said radius of said second set of pinions.

8. The drive unit for an electric vehicle of claim 7 wherein said first set of pinions has a width and said second set of pinions has a width, said width of said first set of pinions being less than that of said second set of pinions.

9. The drive unit for an electric vehicle of claim 6 further comprising a first output drive shaft interconnecting said first drive wheel to said second planetary assembly and a second output drive shaft interconnecting said second drive wheel to said second planetary assembly, and wherein said second planetary assembly comprises a second sun gear driving said second output drive shaft, a second pinion carrier driving said first output shaft, a third set of pinions rotatably supported on said second pinion carrier and meshed with said second sun gear, and a fourth set of pinions rotatably supported on said second pinion carrier and meshed with said third set of pinions.

10. The drive unit for an electric vehicle of claim 4 wherein said transmission further comprises a compound ring-sun gear including a third sun gear meshed with said second set of pinions of said first planetary assembly and a second ring gear meshed with said fourth set of pinions of said second planetary assembly.

11. A drive unit for an electric vehicle, said electric vehicle having a first drive wheel and a second drive wheel, said drive unit comprising:
an electric motor, said electric motor including an output shaft; and
a transmission, said transmission including a transmission housing, a first output drive shaft and a second output drive shaft, both of said drive shafts being rotatably mounted in said transmission housing, said second output drive shaft having a gear formed thereon, said transmission further including a first planetary assembly and a second planetary assembly, said first planetary assembly being operatively connected to said output shaft of said motor, said first planetary assembly and said second planetary assembly being operatively interconnected, by a compound ring sun gear and said second planetary assembly being operatively interconnected with said first and second drive wheels through said first output drive shaft and said second output drive shaft respectively;
said first planetary assembly comprising a sun gear formed on said output shaft of said motor, a pinion carrier, a plurality of pinions rotatably mounted on said pinion carrier, and a ring gear fixed to said transmission housing, said plurality of pinions defining a first gear having a first diameter and a first width and a second gear having a second diameter and a second width, said first diameter being greater than said second diameter and said first width being narrower than said second width;
said second planetary assembly comprising said gear formed on said second output drive shaft as a sun gear, a pinion carrier, a plurality of pinions rotatably mounted on said pinion carrier, and a ring gear, said pinion carrier of said second planetary assembly being operatively associated with said first output drive shaft.

12. The drive unit for an electric vehicle of claim 11 wherein said first gear meshingly engages said sun gear and said ring gear and a second gear meshingly engages said first gear.

13. The drive unit for an electric vehicle of claim 11 wherein said ring gear of said second planetary assembly has an inner peripheral wall and an outer peripheral wall, said outer peripheral wall having defined thereon a plurality of gear teeth, said gear teeth of said outer peripheral wall being in constant meshed engagement with said second gears of said first planetary assembly.

14. The drive unit for an electric vehicle of claim 13 wherein said plurality of pinions of said second planetary assembly comprise ring-engaging pinions and sun-gear engaging pinions.

15. The drive unit for an electric vehicle of claim 14 wherein said inner peripheral wall of said ring gear as defined thereon a plurality of gear teeth, said ring-engaging pinions of said second planetary assembly being in constant mesh engagement with said gear teeth of said inner peripheral wall and with said sun-gear engaging pinions, said sun-gear engaging pinions being in constant meshed engagement with said sun-gear of said second output drive shaft.

16. The drive unit for an electric vehicle of claim 11 wherein said carrier of said first planetary assembly comprises an inner carrier ring and an outer carrier ring, said inner and outer carrier rings being fixed to each other.

17. The drive unit for an electric vehicle of claim 16 wherein said pinions of said first planetary assembly are rotatably mounted on a pin, said pin being fixed between said inner carrier ring and said outer carrier ring, said first and second gears being concentric with respect to said pin and forming compound gears.

18. The drive unit for an electric vehicle of claim 17 wherein said second gears of said pinions are in constant meshed engagement with said ring gear fixed to said transmission housing.

19. The drive unit for an electric vehicle of claim 18 wherein said plurality of pinions of said second planetary assembly comprises a set of ring gear engaging pinions and a set of sun gear engaging pinions, said set of ring gear engaging pinions being in constant meshed engagement with said ring gear and said set of sun gear engaging pinions, and said set of sun-gear engaging pinions being in constant meshed engagement with said sun gear.

20. The drive unit for an electric vehicle of claim 11 wherein said output shaft of said electric motor defines a quill shaft, said second output drive shaft being rotatably mounted in said quill shaft.

* * * * *

UNITED STATES PATENT AND TRADEMARK OFFICE
CERTIFICATE OF CORRECTION

PATENT NO. : 5,718,300
DATED : February 17, 1998
INVENTOR(S) : Barry L. Frost

It is certified that error appears in the above-identified patent and that said Letters Patent is hereby corrected as shown below:

Column 9, line 2, "wail" should be --wall--.

Column 11, line 23, claim 2, "Supported" should be --supported--.

Column 11, line 19/20, claim 2, delete ", rotatably mounted within said output quill shaft and".

Column 12, line 20, claim 10, "Claim 4" should be --Claim 9--.

Signed and Sealed this

Fifteenth Day of December, 1998

Attest:

Attesting Officer

BRUCE LEHMAN

Commissioner of Patents and Trademarks